(12) United States Patent
Yang et al.

(10) Patent No.: US 11,003,295 B2
(45) Date of Patent: May 11, 2021

(54) TOUCH SENSOR AND TOUCH SCREEN PANEL USING SAME

(71) Applicant: MIRAENANOTECH CO., LTD., Cheongju (KR)

(72) Inventors: Jun-mo Yang, Cheonan (KR); Jae-Hun Ye, Cheongju (KR); Tae-il Kim, Cheongju (KR); Seong-Hoon Gye, Asan (KR)

(73) Assignee: MIRAENANOTECH CO., LTD., Cheongju (KR)

( * ) Notice: Subject to any disclaimer, the term of this patent is extended or adjusted under 35 U.S.C. 154(b) by 318 days.

(21) Appl. No.: 16/088,015

(22) PCT Filed: Apr. 3, 2017

(86) PCT No.: PCT/KR2017/003625
§ 371 (c)(1),
(2) Date: Sep. 24, 2018

(87) PCT Pub. No.: WO2017/176014
PCT Pub. Date: Oct. 12, 2017

(65) Prior Publication Data
US 2020/0301545 A1    Sep. 24, 2020

(30) Foreign Application Priority Data

Apr. 5, 2016  (KR) .................. 10-2016-0041962

(51) Int. Cl.
*G06F 3/044*    (2006.01)
(52) U.S. Cl.
CPC .......... *G06F 3/0445* (2019.05); *G06F 3/0446* (2019.05); *G06F 3/0448* (2019.05); *G06F 2203/04112* (2013.01)

(58) Field of Classification Search
CPC .... G06F 3/0446; G06F 3/0445; G06F 3/0448; G06F 2203/04112; G06F 3/0412
See application file for complete search history.

(56) References Cited

U.S. PATENT DOCUMENTS

2011/0124252 A1*  5/2011  Shimomura ............ C23C 18/08
                                                        442/1
2012/0031746 A1   2/2012  Hwang et al.
(Continued)

FOREIGN PATENT DOCUMENTS

| CN | 102308366 A | 1/2012 |
| CN | 104765514 A | 7/2015 |

(Continued)

OTHER PUBLICATIONS

International Search Report for PCT/KR2017/003625 dated May 29, 2017.
(Continued)

*Primary Examiner* — Abhishek Sarma

(57) ABSTRACT

The present invention relates to a touch sensor in which a sensor pattern is irregularly formed, and a touch screen panel using the same. The touch sensor includes a plurality of channels including a plurality of first sensor lines extending in a horizontal direction and a plurality of second sensor lines extending in a vertical direction and in contact with the plurality of first sensor lines at a plurality of contact points to form a mesh pattern. Therefore, occurrence of a moiré phenomenon is prevented, and the contact points between the sensor lines are distributed so as not to be concentrated in any one region, such that generation of a foreign material sensation may be minimized. Therefore, it is possible to prevent a decrease in visibility due to the generation of the foreign material sensation.

9 Claims, 6 Drawing Sheets

(56) References Cited

U.S. PATENT DOCUMENTS

| | | | |
|---|---|---|---|
| 2012/0162116 A1* | 6/2012 | Philipp | ............... G02F 1/13338 |
| | | | 345/173 |
| 2013/0113502 A1* | 5/2013 | Yilmaz | ................... G06F 3/044 |
| | | | 324/649 |
| 2014/0172379 A1* | 6/2014 | Chang | ............... G02F 1/134309 |
| | | | 703/1 |
| 2014/0293154 A1 | 10/2014 | Philipp | |
| 2015/0070292 A1 | 3/2015 | Saran et al. | |

FOREIGN PATENT DOCUMENTS

| | | |
|---|---|---|
| JP | H04217397 A | 8/1992 |
| JP | 2013058180 A | 3/2013 |
| JP | 3197225 U | 4/2015 |

OTHER PUBLICATIONS

Search Report dated Sep. 10, 2019 for European Application No. 17779314.8.

\* cited by examiner

[FIG.1]
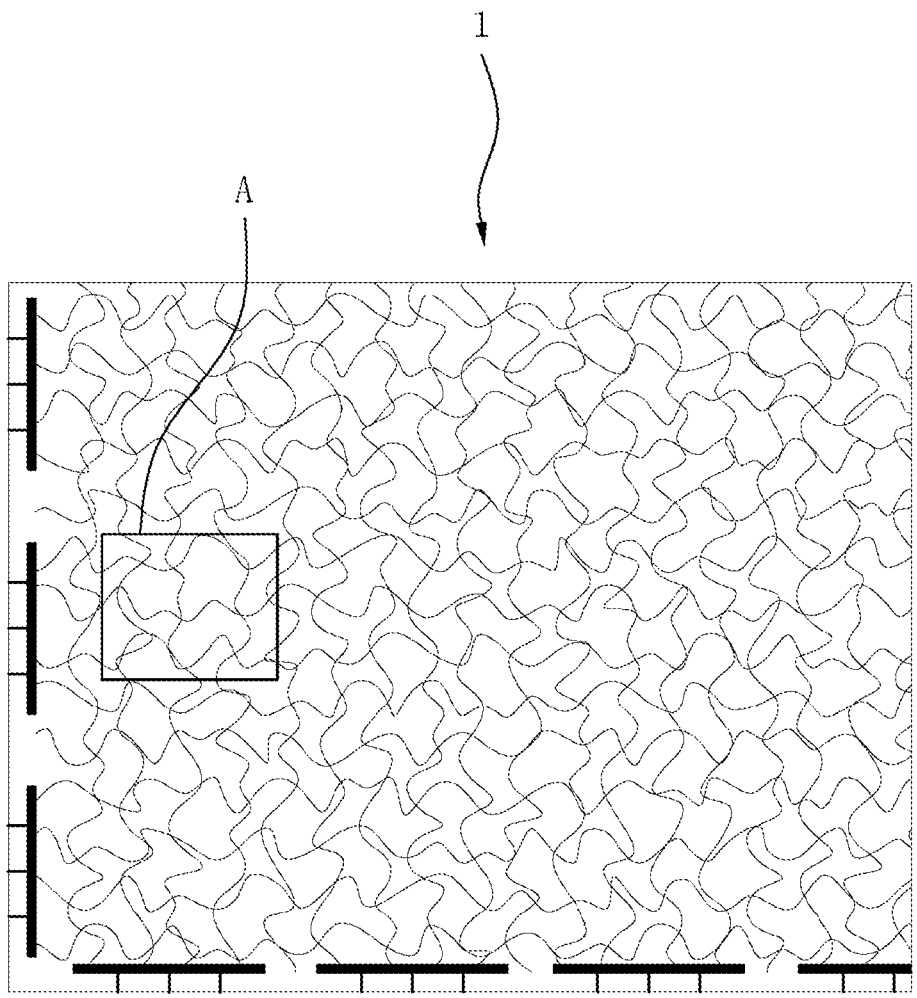

[FIG.2]
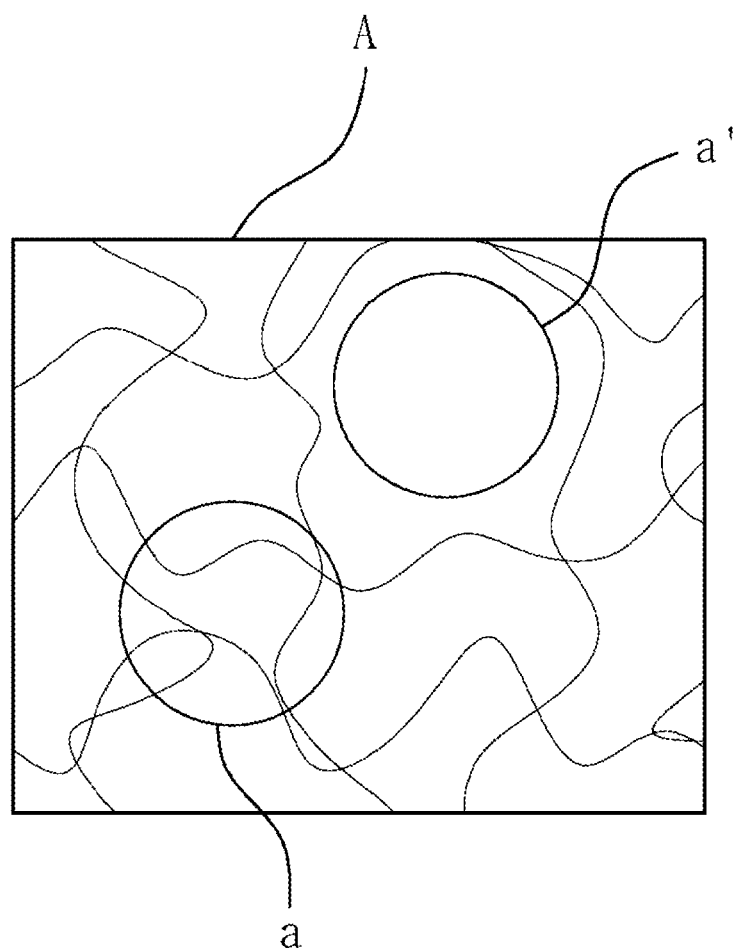

[FIG.3]
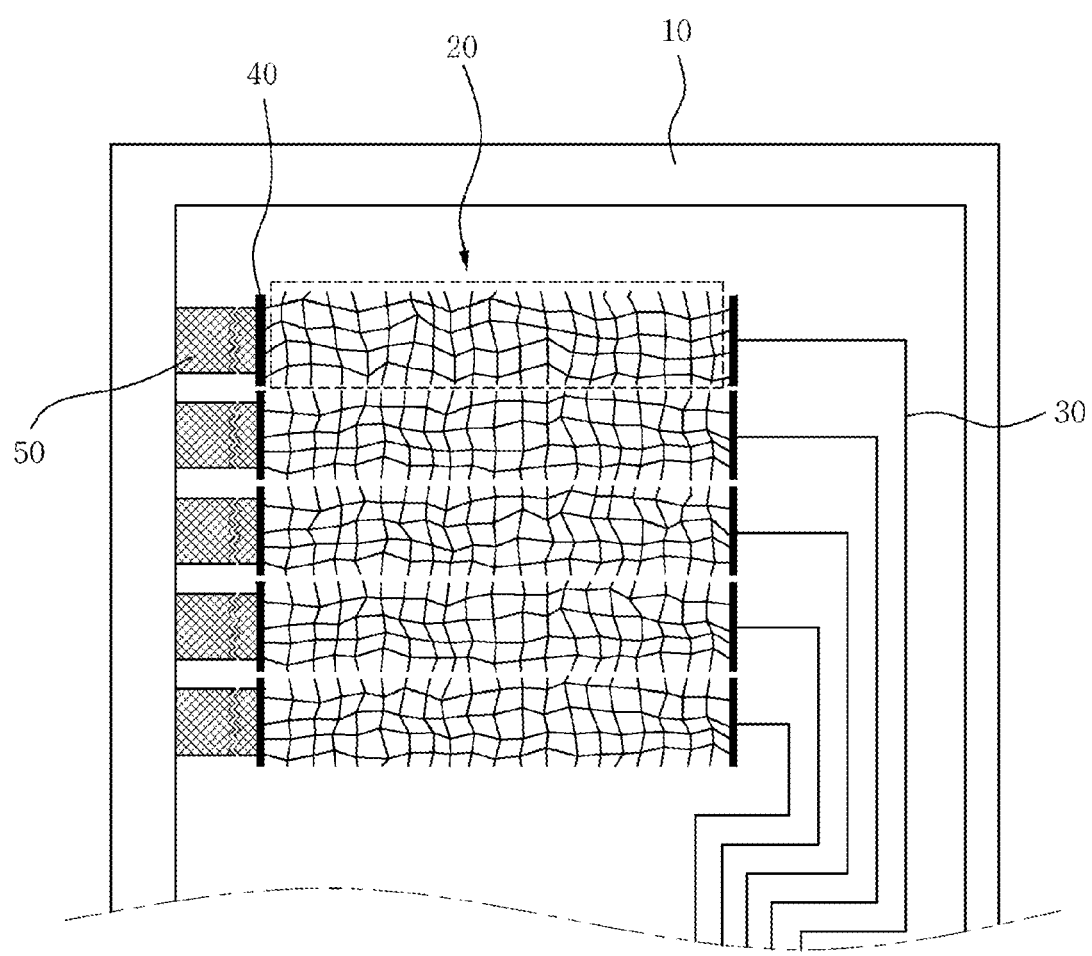

[FIG.4]
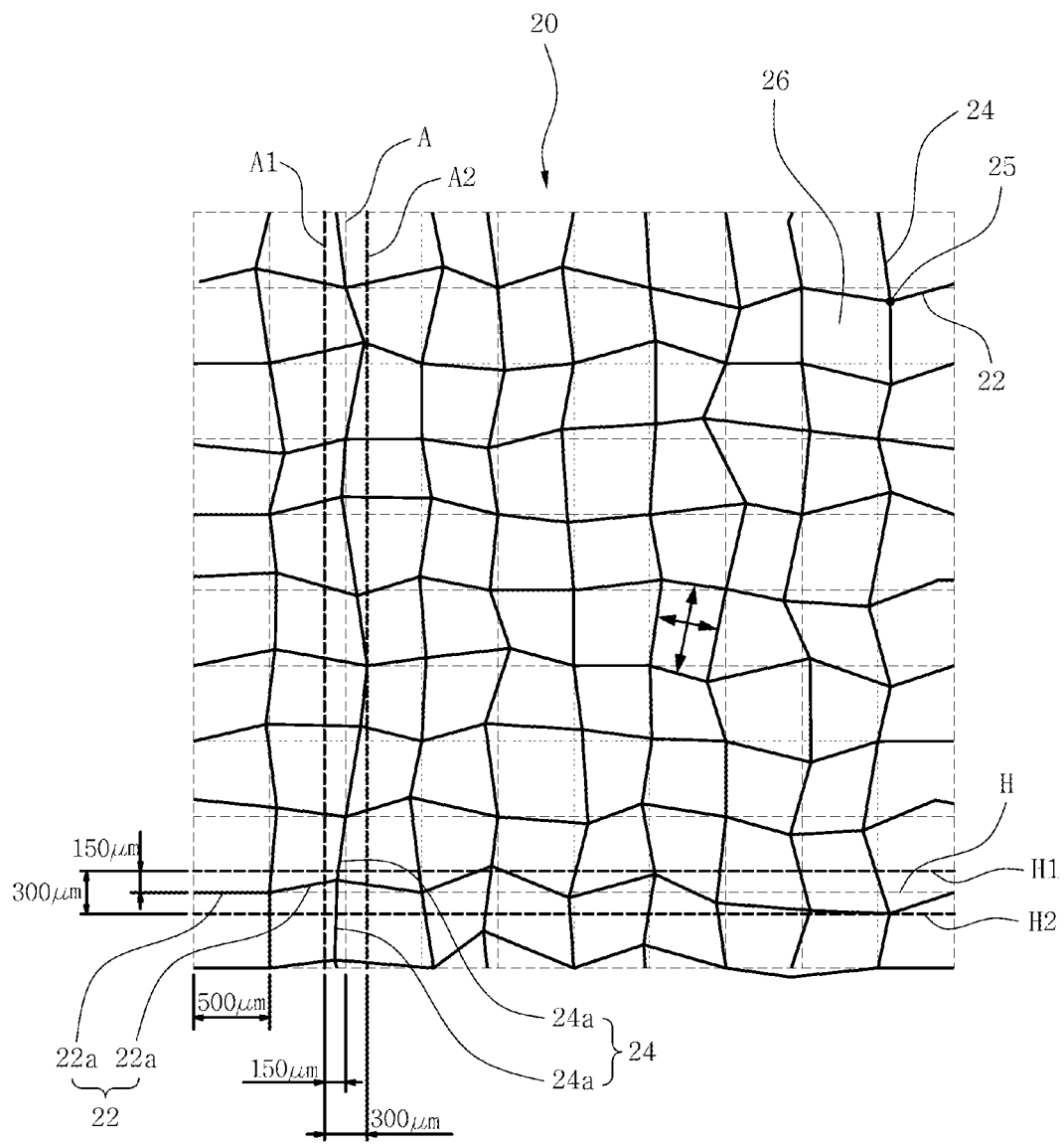

[FIG.5]
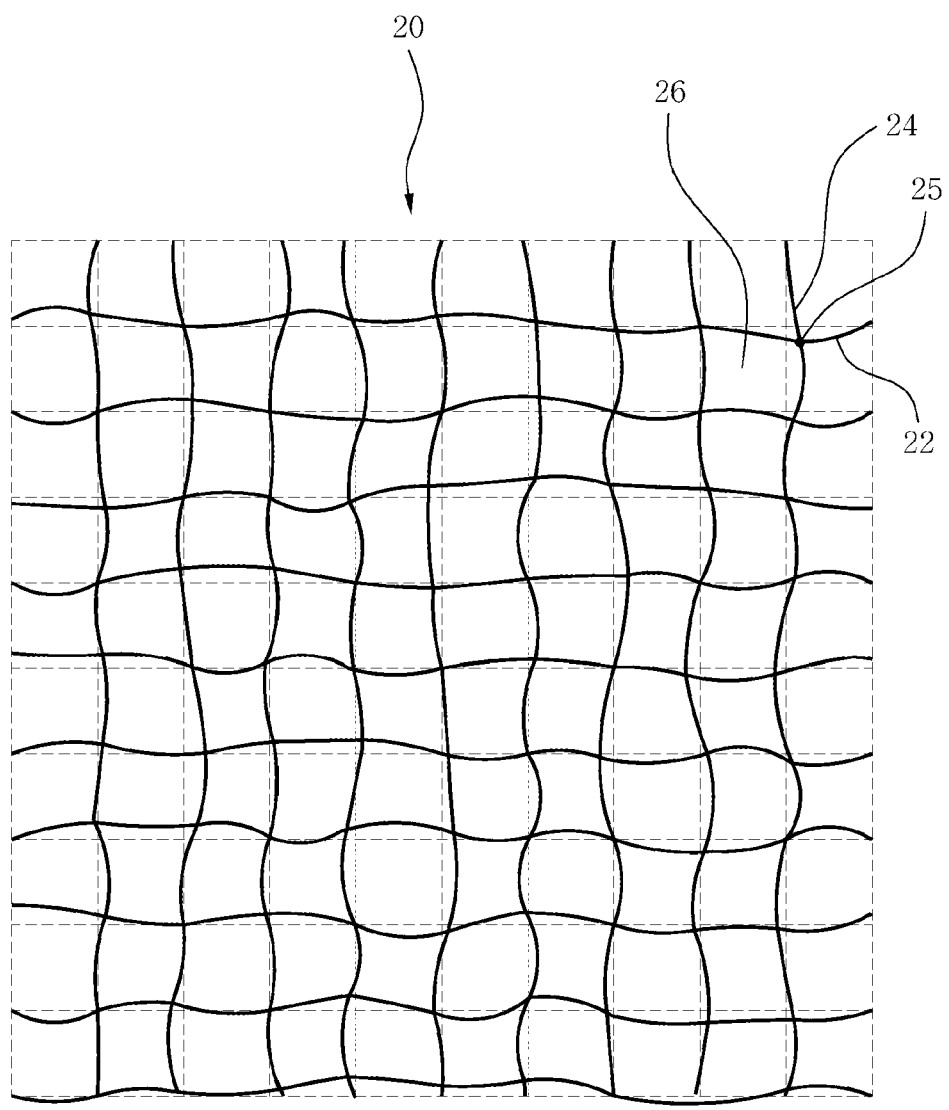

[FIG.6]
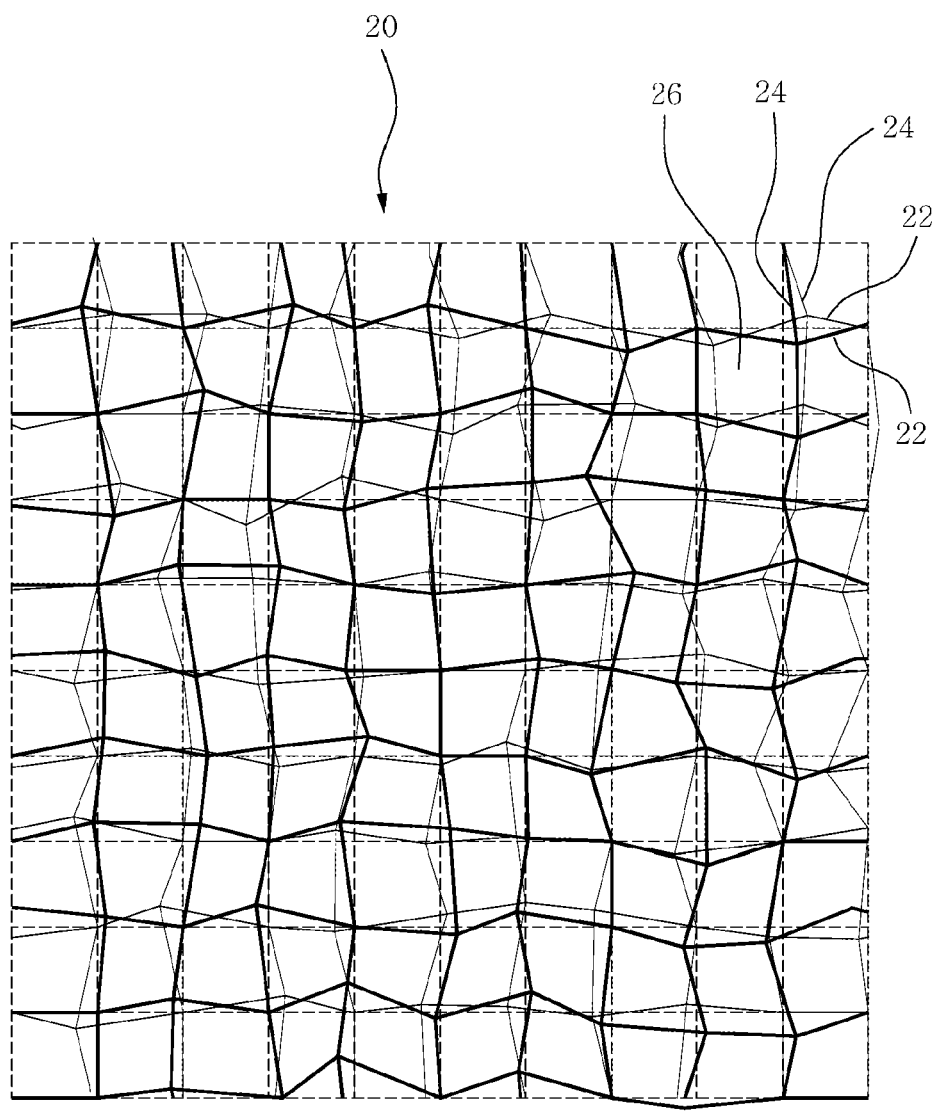

TOUCH SENSOR AND TOUCH SCREEN PANEL USING SAME

CROSS-REFERENCE TO RELATED APPLICATION

This application is a U.S. National Stage of International Patent Application No. PCT/KR2017/003625, filed Apr. 3, 2017, which claims priority to and the benefit of Korean Patent Application No. 10-2016-0041962, filed on Apr. 5, 2016, the disclosures of which are incorporated herein by reference in their entirety.

TECHNICAL FIELD

The present invention relates to a touch sensor and a touch screen panel using the same, and more particularly, to a touch sensor in which a pattern forming the touch sensor is irregularly formed, and a touch screen panel using the same.

BACKGROUND ART

A touch screen panel, which is an input device added onto a display device such as a liquid crystal display (LCD), a plasma display panel (PDP), an organic light emitting diode (OLED), an active matrix organic light emitting diode (AMOLED), or the like, or embedded in the display device, is a device recognizing an object such as a finger, a touch pen, or the like, in contact with a touch screen as an input signal. Such a touch screen panel has been recently mounted mainly in mobile apparatuses such as a mobile phone, a portable multimedia player (PMP), a smartphone, and the like, and has also been used in many industrial fields such as a navigation device, a netbook computer, a laptop computer, a digital information device (DID), a desktop computer using a touch input supporting operating system, an Internet protocol television (IPTV), a state-of-the-art fighter, a tank, an armored motorcar, and the like.

The touch screen panel includes a capacitive type touch screen panel recognizing an input signal by sensing a change in a capacitance, a resistive type touch screen panel recognizing an input signal by sensing a change in a resistance value by a pressure, an infrared sensing type touch screen panel recognizing an input signal by whether or not infrared is blocked using an infrared light emitting element and an infrared light receiving element, and the like. Among them, the capacitive type touch screen panel is most generally used, and the present invention also relates to such a capacitive type touch screen panel and a touch sensor constituting the same.

Generally, the capacitive type touch screen panel is configured by bonding two touch sensors to each other or forming touch sensors on opposite surfaces of one substrate. The touch sensor includes a conducting wire pattern so as to sense a change in a capacitance, and should transmit light emitted from the display device. Therefore, the conducting wire pattern is formed as a mesh pattern such as a mesh. However, since the mesh pattern has a form in which thin conducting wires are repeatedly formed at predetermined intervals, when the two touch sensors overlap each other, a moiré phenomenon occurs.

A touch screen including an irregular sensor pattern according to the related art filed by the present applicant in order to prevent the moiré phenomenon as described above is disclosed in Patent Document 1. FIG. 1 is a plan view of a touch screen panel including an irregular sensor pattern according to the related art, and FIG. 2 is an enlarged view of part A of FIG. 1.

In the touch screen panel including the irregular sensor pattern according to the related art, as illustrated in FIG. 1, the moiré phenomenon may be prevented by the irregular sensor pattern 1, but due to excessive irregularity, as illustrated in FIG. 2, a sensor pattern is concentrated in any one place (region a), and is not concentrated in another place (region a').

Therefore, a foreign material sensation is generated in the region a in which the sensor pattern is concentrated, and is further increased by the region a' in which the sensor pattern is not relatively concentrated. As a result, a problem that visibility is decreased occurs.

That is, in the touch screen panel including the irregular sensor pattern according to the related art, the moiré phenomenon occurring due to a regular sensor pattern is prevented, but the sensor pattern cannot but be concentrated due to the excessive irregularity. As a result, the foreign material sensation is generated, and the visibility is decreased.

DISCLOSURE

Technical Problem

The present invention has been made in order to solve the problems as described above, and an object of the present invention is to provide a touch sensor in which good visibility may be secured by preventing occurrence of a moiré phenomenon and suppressing generation of a foreign material sensation, and a touch screen panel using the same.

Technical Solution

The present invention has been made in order to solve the problems as described above, and an object of the present invention is to provide a touch sensor in which good visibility may be secured by preventing occurrence of a moiré phenomenon and suppressing generation of a foreign material sensation, and a touch screen panel using the same.

Advantageous Effects

In the touch sensor and the touch screen panel according to the present invention, occurrence of a moiré phenomenon is prevented, and contact points between sensor lines are distributed so as not to be concentrated in any one region, such that generation of a foreign material sensation may be minimized. Therefore, it is possible to prevent a decrease in visibility due to the generation of the foreign material sensation.

DESCRIPTION OF DRAWINGS

FIG. 1 is a plan view of a touch screen panel including an irregular sensor pattern according to the related art.

FIG. 2 is an enlarged view of part A of FIG. 1.

FIG. 3 is a plan view of a touch sensor according to the present invention.

FIGS. 4 and 5 are plan views of the touch sensor according to the present invention.

FIG. 6 is a plan view of touch sensors bonded to each other according to the present invention.

BEST MODE

Hereinafter, a touch sensor and a touch screen panel according to the present invention will be described in more detail with reference to the accompanying drawings.

A touch sensor according to the present invention is configured to include a plurality of channels including a plurality of first sensor lines extending in a horizontal direction and a plurality of second sensor lines extending in a vertical direction and in contact with the plurality of first sensor lines at a plurality of contact points to form a mesh pattern.

FIG. 3 is a plan view of a touch sensor according to the present invention. The touch sensor according to the present invention may be configured to include a substrate 10, a plurality of channels 20 formed on the substrate, and a wiring pattern 30 connecting the channels 20 to an external circuit, and may be configured to further include resistance measuring terminals 40 and discharging terminals 50 disposed at one ends of the channels 20.

The substrate 10, which is one region of a substrate on which the channels 20 and the wiring pattern 30 are formed, may be a transparent film, a glass substrate, a plastic substrate, or the like. That is, a material of the substrate 10 is not limited. Particularly, the substrate 10 may be formed of a transparent film. The transparent film may be formed using at least one of polyethylene terephthalate (PET), polyimide (PI), acryl, polyethylene naphthalate (PEN), and glass.

The channels 20 are components formed in the plural and sensing a touch signal of a user, and as illustrated in FIG. 3, one channel 20 forms a mesh pattern in a form in which the plurality of first sensor lines 22 extending in the horizontal direction and the plurality of second sensor lines 24 extending in the vertical direction intersect with each other. In this case, the first sensor lines 22 and the second sensor lines 24 are irregular lines formed in forms in which a plurality of unit lines 22a and 24a are continuously connected to each other, respectively. The channel 20 according to the present invention is formed by the plurality of first sensor lines 22 and the plurality of second sensor lines 24 intersecting with each other. Therefore, cells 26 having four vertices (that are the same as contact points 25 to be described below) are formed in the channel 20.

FIGS. 4 and 5 are plan views of the touch sensor according to the present invention, wherein FIG. 4 illustrates a case in which a sensor line between the contact points 25 is a straight line, and FIG. 5 illustrates a case in which a sensor line between the contact points 25 is a curved line.

Hereinafter, a condition of a pattern in which the first sensor lines 22 and the second sensor lines 24 are generated will be described. For reference, as illustrated in FIGS. 4 and 5, a virtual reference mesh pattern (denoted by dotted lines) including a plurality of horizontal reference lines and a plurality of vertical reference lines is formed. The virtual reference mesh pattern, which is reference lines of the first and second sensor lines 22 and according to the present invention, is not a direct component of the present invention. The virtual reference mesh pattern includes a plurality of unit cells that each has a rectangular shape. For example, a rectangle refers to a quadrangle of which all of the four angles are right angles. In addition, a unit cell according to an exemplary embodiment of the present invention to be described below is based on a square having a horizontal length and a vertical length of 500 μm.

First, in the touch sensor according to the present invention, in the case in which the channel 20 overlaps the virtual reference mesh pattern, the first sensor line 22 is varied within a range of a width of ±30% or less with respect to a horizontal reference line H of the virtual reference mesh pattern. The second sensor line 24 is also varied within a range of a width of ±30% or less with respect to a vertical reference line A of the virtual reference mesh pattern. For example, in an exemplary embodiment of the present invention, considering that the horizontal length and the vertical length of the unit cell are 500 μm, one first sensor line 22 is varied between a first horizontal reference line H1 moved from the horizontal reference line H in an upward direction by 150 μm and a second horizontal reference line H2 from the horizontal reference line H in a downward direction by 150 μm, as illustrated in FIG. 4. Likewise, one second sensor line 24 is varied between a first vertical reference line A1 moved from the vertical reference line A in a leftward direction by 150 μm and a second vertical reference line A2 from the vertical reference line A in a rightward direction by 150 μm, as illustrated in FIG. 4. As a result, variable widths of the first and second sensor lines 22 and 24 are a total of 60%.

In addition, when the first and second sensor lines 22 and 24 meet lines forming reference widths of ±30%, directions of the first and second sensor lines 22 and 24 are changed, such that the first and second sensor lines 22 and 24 do not exceed the reference widths. For example, when the first sensor line 22 meets the first horizontal reference line H1 or the second horizontal reference line H2, the direction of the first sensor line 22 is changed, and when the second sensor line 24 meets the first vertical reference line A1 or the second vertical reference line A2, the direction of the second sensor line 24 is changed. For reference, the meaning that the direction of the first sensor line 22 or the second sensor line 24 is changed is that an included angle formed by each sensor line 22 and 24 and the reference lines A and H corresponding to each sensor line 22 and 24 is changed from a positive value (+) to a negative value (−) or is changed from a negative value (−) to a positive value (+) {References of the positive value (+) and the negative value (−) of the included angle change depending on setting. For example, when a case in which an included angle between the first sensor line 22 and the horizontal reference line H is formed above the horizontal reference line H is set to the positive value (+), a case in which the included angle between the first sensor line 22 and the horizontal reference line H is formed below the horizontal reference line H is set to the negative value (−). In addition, when the first sensor line 22 does not meet the horizontal reference line H, the inclined angle is set on the basis of a case of arbitrarily extending the first sensor line 22 to allow the first sensor line 22 to meet the horizontal reference line H}.

In the case in which the touch sensor has an excessive irregular sensor pattern such as the irregular sensor pattern according to the related art described above, the contact points 25 between the first and second sensor lines 22 and 24 may be concentrated in any one region, such that a foreign material sensation may be generated. However, in the touch sensor according to the present invention, since variation widths of the first and second sensor lines 22 and 24 are limited to 60% or less with respect to the virtual reference mesh pattern, the contact points 25 between the first and second sensor lines 22 and 24 are not concentrated in any one region. Therefore, in the touch sensor according to the present invention, the concentration of the contact points 25 is prevented, such that the foreign material sensation may be minimized. Therefore, it is possible to prevent a decrease in visibility due to the generation of the foreign material sensation.

In addition, it is preferable that an area of one cell 26 of the channel 20 is about ±20% of an area of a unit cell of the virtual reference mesh pattern. That is, the area of one cell 26 of the channel 20 may be 80 to 120% of the area of the unit cell of the virtual reference mesh pattern. For example, when a cell 26 having an area smaller than 80% of the area of the cell of the virtual reference mesh pattern and a cell 26 having an area greater than 120% of the area of the cell of the virtual reference mesh pattern are adjacent to each other, the contact points 25 may be concentrated in any one region. When the contact points 25 are concentrated in any one region as described above, the foreign material sensation may be generated. However, the area of one cell 26 has a variation width of −20% to 20% with respect to an area of a square shaped unit reference pattern formed by four adjacent contact points in the virtual reference mesh pattern, such that it is possible to prevent the contact points 25 from being concentrated in any one region.

In addition, it is preferable that a plurality of first or second sensor lines 22 or 24 connecting five continuous contact points 25 of a plurality of contact points 25 are not a straight line. That is, only three first unit lines 22a or three second unit lines 24a connected to four contact points 25 may be a continuous straight line, and first unit lines 22a of the first sensor line 22 or second unit lines 24a of the second sensor line are not repeated four times or more in the same direction and at the same angle. When four or more first unit lines 22a or four or more second unit lines 24a are a straight line, a moiré phenomenon may be caused.

In addition, in the channel 20 according to the present invention, it is preferable that line widths of the first and second sensor lines 22 and 24 are 20 μm or less (at least 1 μm or more in consideration of workability and electrical conductivity) and lengths of one unit lines 22a and 24a are 150% or less of a length (500 μm) of a line segment forming one cell of the virtual reference mesh pattern. That is, in an exemplary embodiment of the present invention, it is preferable that one unit lines 22a and 24a are formed at a length of at most 750 μm or less {for reference, lengths of the unit lines 22a and 24a for visibility are 500 μm}. This is to prevent a decrease in the visibility, and the reason is that when the line widths of the first and second sensor lines 22 and 24 exceed 20 μm and the lengths of the unit lines 22a and 24a exceed 750 μm, there is a risk that the contact points 25 will be concentrated, and the visibility may thus be decreased.

In addition, when the first and second sensor lines 22 and 24 are irregular straight lines, as illustrated in FIG. 4, angles of the unit lines 22a and 24a are 30° or less. That is, an included angle between the first unit line 22a and the vertical reference line A of the virtual reference mesh pattern is 30° or less, and an included angle between the second unit line 24a and the horizontal reference line H of the virtual reference mesh pattern is 30° or less.

Meanwhile, the first and second sensor lines 22 and 24 according to the present invention may be curved lines as illustrated in FIG. 5. The respective rules described above are also applied to this case.

FIG. 6 is a plan view of touch sensors bonded to each other according to the present invention. One touch screen panel may be configured by bonding the two touch sensors as described above to each other. When the two touch sensors according to the present invention are bonded to each other, a yield and an electrostatic discharge (ESD) resistance rate are improved, which will be described in detail through the following Tables.

TABLE 1

| Division | Upper Plate | Lower Plate | Average |
|---|---|---|---|
| Touch sensors bonded to each other according to the related art | 87.0% | 91.0% | 89.0% |
| Touch sensors bonded to each other according to the present invention | 94.8% | 100.0% | 97.4% |

TABLE 2

| Division | 10 kV | 20 kV | Average |
|---|---|---|---|
| Touch sensors bonded to each other according to the related art | 72.0% | 0.0% | 36.0% |
| Touch sensors bonded to each other according to the present invention | 98.0% | 78.0% | 88.0% |

Table 1 is a table for comparing yields of touch sensors bonded to each other according to the related art and touch sensors bonded to each other according to the present invention with each other, and Table 2 is a table for comparing ESD resistance rates of the touch sensors bonded to each other according to the related art and the touch sensors bonded to each other according to the present invention with each other. It may be confirmed from Table 1 that the yield is improved from 89.0% to 97.4%, and it may be confirmed from Table 2 that the ESD resistance rate is improved from 36.0% to 88.0%. It may be considered that sections of a plurality of contact points 25 are secured as compared with the related art, such that a disconnection occurrence rate is decreased, resulting in a decrease in a defective rate and an increase in resistance to ESD.

The wiring pattern 30, which is a component transferring to the touch signal sensed from the channel 20 to an external circuit (not illustrated), is connected to one end of the channel 10 formed on the substrate 10.

The resistance measuring terminal 40 is formed on a side end of the sensor pattern 20 that is not connected to the wiring pattern 30, that is, the other end of the channel 20 when an end, connected to the wiring pattern 30, of both ends of the channel 20 is one end, and is used to detect disconnection of an electrode, whether or not a resistance is increased or decreased, or the like.

In detail, when a current is applied to the wiring pattern 30, it may be determined whether or not a disconnection and a short-circuit occur in the sensor pattern 20 connected to the wiring pattern 30 or the wiring pattern 30 using a voltage measured by the resistance measuring terminal 40. For example, when the voltage measured by the resistance measuring terminal 40 is lower than a preset normal value, it may be determined that a disconnection occurs in the channel 20, and when the voltage measured by the resistance measuring terminal 40 is higher than the preset normal value, it may be determined that a short-circuit occurs between the channels 20.

The discharging terminal 50 is a component formed on a side end of the channel 20 that is not connected to the wiring pattern 30, that is, the other end of the channel 20 when an end, connected to the wiring pattern 30, of both ends of the channel 20 is one end, and discharging static electricity induced in the channel 20.

Meanwhile, the channel 20 may be formed in a form in which it is buried in the substrate 10, that is, an intaglio form. When the channel 20 is formed in the intaglio form, a roll-to-roll manner of rolling the substrate in which the sensor pattern is formed around a roll, filling a conductive material in an intaglio while unrolling the substrate from the roll, and then rolling the substrate around the roll may be used, which is a convenient process and is appropriate for mass production.

[Detailed Description of Main Elements]

| | |
|---|---|
| H: Horizontal reference line | H1: First horizontal reference line |
| H2: Second horizontal reference line | A: Vertical reference line |
| A1: First vertical reference line | A2: Second vertical reference line |
| 10: Substrate | 20: Irregular sensor pattern |
| 22: First sensor line | 22a: First unit line |
| 24: Second sensor line | 24a: Second unit line |
| 25: Contact point | 26: Cell |
| 30: Wiring pattern | 40: Resistance measuring terminal |
| 50: Discharging terminal | |

The invention claimed is:

1. A touch sensor comprising:
a plurality of channels including a plurality of first sensor lines and a plurality of second sensor lines in contact with the plurality of first sensor lines at a plurality of contact points to form a mesh pattern,
wherein the channel is formed on the basis of a virtual mesh pattern including a plurality of unit cells having a rectangular shape in which a plurality of horizontal reference lines and a plurality of vertical reference lines overlap each other,
the first sensor line is an irregular line variably formed within a range of a predetermined width with respect to the horizontal reference line, the second sensor line is an irregular line variably formed within a range of a predetermined width with respect to the vertical reference line,
wherein the first sensor line includes a plurality of first unit lines, the second sensor line includes a plurality of second unit lines, four or more continuous first unit lines or four or more continuous second unit lines change at least one direction,
wherein the first sensor line includes three continuous first unit lines without changing the sign of an included angle with respect to the horizontal reference line, the second sensor line includes three continuous second unit lines without changing the sign of an included angle with respect to the vertical reference line,
when the first sensor line meets a first horizontal reference line or a second horizontal reference line corresponding to the predetermined width with respect to the horizontal reference line, a direction of the first sensor line is changed, and when the second sensor line meets a first vertical reference line or a second vertical reference line corresponding to the predetermined width with respect to the vertical reference line, a direction of the second sensor line is changed.

2. The touch sensor of claim 1, wherein the first sensor line is formed along the horizontal reference line, and is an irregular line variably formed within a range of a width of ±30% with respect to the horizontal reference line,
the second sensor line is formed along the vertical reference line, and is an irregular line variably formed within a width of ±30% with respect to the vertical reference line, and
the range of a predetermined width is set ±30%, the width of 30% is based on a length of one side of the unit cell.

3. The touch sensor of claim 1, wherein the included angle between the first unit line and the horizontal reference line is 30° or less, and the included angle between the second unit line and the vertical reference line is 30° or less.

4. The touch sensor of claim 1, wherein the first sensor line includes a plurality of first unit lines,
the second sensor line includes a plurality of second unit lines, and
the first unit lines or the second unit lines are straight lines or curved lines.

5. The touch sensor of claim 1, wherein the first sensor line includes the three continuous first unit lines formed in a straight line, the second sensor line includes the three continuous second unit lines formed in a straight line.

6. The touch sensor of claim 1, wherein lengths of the first unit line and the second unit line are 150% or less of the length of one side of the unit cell.

7. The touch sensor of claim 1, wherein an area of a unit pattern of a figure formed by four adjacent contact points in the mesh pattern of the channel has a variation width of −20% to +20% with respect to an area of one unit cell of the virtual reference mesh pattern.

8. The touch sensor of claim 1, wherein line widths of the first and second sensor lines are 1 to 20 μm.

9. A touch screen panel configured by bonding two touch sensors of claim 1.

* * * * *